United States Patent
Ohara et al.

(10) Patent No.: US 10,577,255 B2
(45) Date of Patent: Mar. 3, 2020

(54) METHOD FOR PRODUCING SOLUTIONS CONTAINING NICKEL OR COBALT

(71) Applicant: SUMITOMO METAL MINING CO., LTD., Tokyo (JP)

(72) Inventors: Hideki Ohara, Niihama (JP); Toshirou Tan, Niihama (JP); Masatoshi Takano, Niihama (JP); Satoshi Asano, Niihama (JP); Hiroshi Kobayashi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/329,400

(22) PCT Filed: Sep. 1, 2017

(86) PCT No.: PCT/JP2017/031569
§ 371 (c)(1),
(2) Date: Feb. 28, 2019

(87) PCT Pub. No.: WO2018/043703
PCT Pub. Date: Mar. 8, 2018

(65) Prior Publication Data
US 2019/0194031 A1 Jun. 27, 2019

(30) Foreign Application Priority Data
Sep. 5, 2016 (JP) .................. 2016-172877

(51) Int. Cl.
*C01G 53/10* (2006.01)
*C01G 53/00* (2006.01)
(Continued)

(52) U.S. Cl.
CPC .......... *C01G 53/10* (2013.01); *B01D 11/0492* (2013.01); *C01G 51/003* (2013.01);
(Continued)

(58) Field of Classification Search
CPC ...... C01G 51/10; C01G 53/10; C01G 51/003; C01G 53/003; Y02P 10/234;
(Continued)

(56) References Cited

U.S. PATENT DOCUMENTS 2,822,264 A * 2/1958 Benoit .................. C01G 51/10
423/142
4,541,868 A * 9/1985 Lowenhaupt .......... C01G 51/10
423/140

(Continued)

FOREIGN PATENT DOCUMENTS

GB 1 141 777 A * 1/1969 ............. C01G 51/10
JP 50-231420 A 11/1985
(Continued)

OTHER PUBLICATIONS

Cheng, Chu Yong, "Purification of synthetic laterite leach solution by solvent extraction using D2EHPA," Hydrometallurgy, 2000. 07, vol. 56, p. 369-386.
(Continued)

*Primary Examiner* — Timothy C Vanoy
(74) *Attorney, Agent, or Firm* — Locke Lord LLP

(57) ABSTRACT

Provided is a method for producing solutions, by which two solutions, namely a high-purity nickel sulfate solution and a mixed solution of nickel sulfate and cobalt sulfate are able to be obtained at the same time from a sulfuric acid solution containing nickel, cobalt and calcium. A method for producing solutions according to the present invention uses a sulfuric acid solution containing nickel, cobalt and calcium and performs a first step S1 for producing a mixed solution of nickel sulfate and cobalt sulfate from the sulfuric acid solution and a second step S2 for producing a solution of nickel sulfate from the sulfuric acid solution in parallel. In the first step, the sulfuric acid solution is subjected to solvent extraction by an extractant, thereby obtaining a first organic
(Continued)

solvent after extraction. In the second step, the sulfuric acid solution is subjected to solvent extraction by means of an extractant.

20 Claims, 1 Drawing Sheet

(51) Int. Cl.
    *C01G 51/10*     (2006.01)
    *C01G 51/00*     (2006.01)
    *B01D 11/04*     (2006.01)

(52) U.S. Cl.
    CPC ........... *C01G 51/10* (2013.01); *C01G 53/003* (2013.01); *C01P 2006/40* (2013.01); *Y02P 10/234* (2015.11)

(58) Field of Classification Search
    CPC ............. C01P 2006/40; B01D 11/0492; C01B 17/901; C01B 17/903; C01B 17/96
    See application file for complete search history.

(56) References Cited

U.S. PATENT DOCUMENTS

| | | | |
|---|---|---|---|
| 4,900,522 A * | 2/1990 | Chou | C01G 51/003 210/688 |
| 5,682,593 A * | 10/1997 | Holzner | C01B 7/0737 423/10 |
| 2007/0248514 A1* | 10/2007 | Cheng | C22B 3/0017 423/139 |

FOREIGN PATENT DOCUMENTS

| | | | | |
|---|---|---|---|---|
| JP | 2008-013387 A | 1/2008 | | |
| JP | 2012-072482 A | 4/2012 | | |
| JP | 2013-139593 A | 7/2013 | | |
| JP | 2015 212424 A | * | 11/2015 | ............ Y02P 10/234 |
| JP | 2017 8407 A | * | 1/2017 | ............ Y02P 10/234 |
| WO | 02/22896 A1 | 3/2002 | | |

OTHER PUBLICATIONS

International Search Report dated Oct. 24, 2017, issued for PCT/JP2017/031569.
A. C. du Preez et al., "Separation of nickel and cobalt from calcium, magnesium and manganese by solvent extraction with synergistic mixtures of carboxylic acids", The Journal of the South African Institute of Mining and Metallurgy, 2004, pp. 333-338. (cited in the Jan. 8, 2020 Search Report issued for EP17846706.4).
Qing-Jun Guan et al., "Recovery of cobalt and nickel in the presence of magnesium and calcium from sulfate solutions by Versatic 10 and mixtures of Versatic 10 and Cyanex 301", Transactions of Nonferrous Metal Society of China, vol. 26, No. 3, 2016, pp. 865-873. (cited in the Jan. 8, 2020 Search Report issued for EP17846706.4).
D. S. Flett, "Cobalt-Nickel Separation in Hydrometallurgy: a Review", Chemistry for Sustainable Development, vol. 12, 2004, pp. 81-91. (cited in the Jan. 8, 2020 Search Report issued for EP17846706.4).
Sil Wellens et al., "An environmentally friendlier approach to hydrometallurgy: highly selective separation of cobalt from nickel by solvent extraction with undiluted phosphonium ionic liquids", Green Chemistry, vol. 14, No. 6, 2012, pp. 1657-1665. (cited in the Jan. 8, 2020 Search Report issued for EP17846706.4).
Extended European Search Report dated Jan. 8, 2020, issued in the EP Patent Application No. 17846706.4.

* cited by examiner

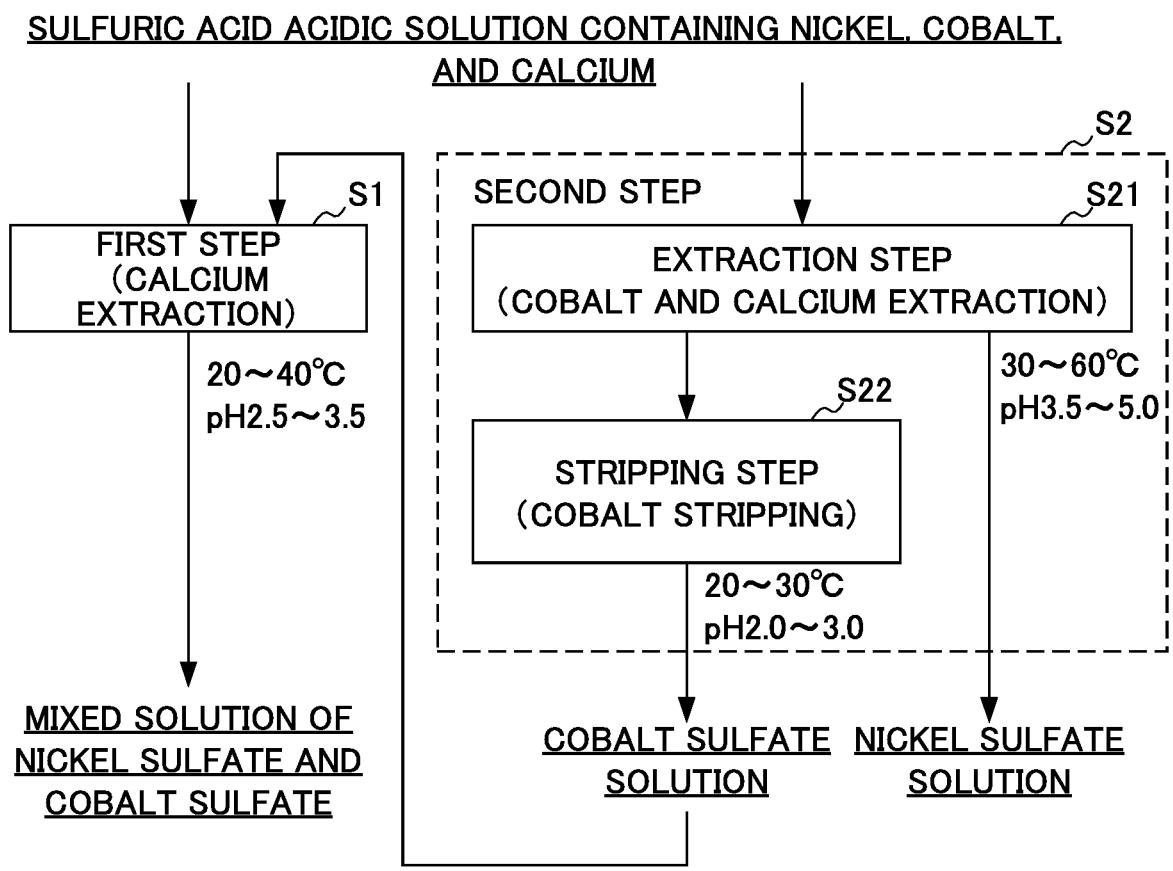

METHOD FOR PRODUCING SOLUTIONS CONTAINING NICKEL OR COBALT

TECHNICAL FIELD

The present invention relates to a method for producing solutions, and specifically to a method for producing solutions, the method using a sulfuric acid solution containing nickel, cobalt, and calcium to produce nickel sulfate solution and a mixed solution of nickel sulfate and cobalt sulfate.

BACKGROUND ART

Various positive electrode materials have been developed as positive electrode materials of lithium ion batteries as secondary batteries. Particularly, in recent years, instead of lithium cobaltate that has been used conventionally, a nickel-cobalt-manganese (NCM)-based positive electrode material that is called a ternary positive electrode material, a nickel-cobalt-aluminum (NCA) positive electrode material that is called a nickel-based positive electrode material, or the like is drawing attention.

The positive electrode material containing nickel as described above is produced, for example, by treating a solution containing a salt of metal such as nickel with alkali and subjecting the obtained metal hydroxide to a calcination treatment. Such a metal salt is produced, for example, in a nickel smelting step using a nickel oxide ore or the like as a raw material, and specific examples thereof include a chloride (nickel chloride) and a sulfuric acid salt (nickel sulfate). Incidentally, of them, in the case of using a chloride, when a hydroxide obtained by neutralizing a chloride is calcined, remaining chloride ions become chlorine gas and this chlorine gas may cause corrosion damage of a firing furnace. For this reason, in general, a sulfuric acid salt is used as a metal salt in many cases.

Herein, the nickel sulfate is obtained as a by-product of a step of smelting electrolytic nickel from a nickel oxide ore. However, since cobalt is also contained in the nickel oxide ore in many cases and cobalt is also co-precipitated in the electrolytic nickel, the quality of the electrolytic nickel is degraded; meanwhile, the recovery loss of cobalt as a valuable metal may occur.

For this reason, nickel and cobalt are separated using a wet treatment such as a solvent extraction method in the smelting process, but since those metals have similar chemical properties, it is not easy to separate each metal, and lots of cost is required.

Incidentally, a positive electrode material such as an NCM-based positive electrode material or an NCA-based positive electrode material is formed from a composite metal oxide containing nickel and cobalt. That is, in the aspect of nickel smelting, if nickel sulfate containing cobalt as impurities is used without change as a raw material for producing an NCM-based positive electrode material or an NCA-based positive electrode material, it is not necessary to separate nickel and cobalt, so that the nickel sulfate may be a material that is advantageous in terms of cost.

However, in the aforementioned nickel sulfate, calcium derived from a neutralizing agent to be added in the process of smelting electrolytic nickel from a nickel oxide ore or calcium existing in the nickel oxide ore itself as a raw material may be contained. Further, when a positive electrode material such as an NCM-based positive electrode material or an NCA-based positive electrode material is produced using such nickel sulfate containing calcium as a raw material, calcium is contained as impurities in the electrode, and according to this, battery characteristics such as charge and discharge capacity of a lithium ion battery may be largely degraded. Therefore, in order to use nickel sulfate containing cobalt as a raw material for producing an NCM-based positive electrode material or an NCA-based positive electrode material, it is important to efficiently and easily remove calcium as impurities.

As a known method for removing such an impurity metal, methods such as a precipitation method, a cementation method, a crystallization method, and a solvent extraction method are exemplified.

Of them, the precipitation method is to precipitate metal ions to be removed as a sulfuric acid salt or a hydroxide and then remove the metal ions. However, calcium ions cannot be precipitated as a sulfuric acid salt. Further, in the case of precipitating calcium ions as a hydroxide, it is necessary to prevent co-precipitation of components to be recovered such as nickel and cobalt; however, under the alkali condition of a high pH for precipitating calcium as a hydroxide, nickel and cobalt are also precipitated as hydroxides. Therefore, it is difficult to separate calcium from nickel and cobalt by such a precipitation method.

Further, the cementation method is a separation method using the phenomenon that, in a case where metal ions exist in an aqueous solution, when a metal having a lower oxidation-reduction potential than that of a metal existing as ions is added, exchange of electrons is performed between the metal ions and the added metal, the metal ions are reduced to metal and precipitated, and the added metal is oxidized and dissolved as ions. However, since a standard oxidation-reduction potential of calcium is lower than a standard oxidation-reduction potential of hydrogen, even in the case of adding a lower oxidation-reduction potential than calcium, protons are reduced so that calcium is not reduced. Therefore, calcium cannot be removed even by the cementation method.

The precipitation method and the cementation method as described above are methods for precipitating a metal to be removed in the aqueous solution and remove the metal; on the other hand, the crystallization method is a method for heating and condensing an aqueous solution to precipitate a salt of nickel sulfate or cobalt sulfate and remaining impurities in a mother liquid for crystallization to perform purification. However, in this method, since a solution containing sulfuric acid ions is used, calcium reacts with sulfuric acid ions, and thus hardly soluble gypsum ($CaSO_4 \cdot 2H_2O$) may be formed. Therefore, when the level of concentration of a metal is increased in order to recover nickel and cobalt with a high recovery rate, the calcium concentration is also increased inevitably, so that a possibility that gypsum is formed increases. On the other hand, when the formation of gypsum is tried to be suppressed, the level of concentration of the metal cannot be increased, so that it is not possible to obtain nickel and cobalt with a high recovery rate. Further, in the method by the crystallization method, cost required for heating for condensation is also increased.

Meanwhile, the solvent extraction method is a method for extracting impurities in an organic solvent and removing the impurities, and by appropriately setting an extractant and an extraction condition, impurities can be selectively removed. As a method for removing calcium from a nickel sulfate aqueous solution using the solvent extraction method, for example, Patent Document 1 proposes a method for removing calcium to be dissolved in an electrolyte of nickel using alkylphosphate ester as an extractant. Specifically, by using alkylphosphate ester as an extractant and adjusting the pH of the nickel solution at the time of extraction to 1.5 or more and 5.0 or less, extraction and removal of calcium as impurities from the solution are performed. In particular, by adjusting the pH of the solution at the time of extraction to 4.0, the content of calcium in the nickel sulfate solution can be reduced to 50 mg/L or less.

However, in the method described in Patent Document 1, when the pH of the solution is adjusted to around 4.0 at which the content of calcium in the nickel sulfate solution is reduced, cobalt as a rare metal is also extracted and removed at the same time, so that cobalt cannot be effectively used. That is, for example, upon producing a positive electrode material such as an NCM-based positive electrode material or an NCA-based positive electrode material, it is necessary to separately prepare a supply raw material of cobalt, so that production cost increases.

Further, as described above, in production of a positive electrode material of a battery, a mixed solution of nickel sulfate and cobalt sulfate is demanded, but in production of a plating material or a catalyst, a demand for a high-purity nickel sulfate solution is large. By producing only a mixed solution of nickel sulfate and cobalt sulfate of which use application is limited almost to production of a positive electrode material of a battery, a demand with respect to production of a plating material or a catalyst cannot be satisfied.

From such a point, a process by which both a mixed solution of nickel sulfate and cobalt sulfate and a high-purity nickel sulfate solution can be efficiently produced is demanded.

Patent Document 1: Japanese Unexamined Patent Application, Publication No. 2012-072482

DISCLOSURE OF THE INVENTION

Problems to be Solved by the Invention

The present invention is made in view of such circumstances, and an object thereof is to provide a method for producing solutions by which two solutions, namely a high-purity nickel sulfate solution and a mixed solution of nickel sulfate and cobalt sulfate can be efficiently obtained from a sulfuric acid solution containing nickel, cobalt, and calcium.

Means for Solving the Problems

The present inventors have conducted intensive studies in order to achieve the aforementioned object, and as a result, have found that by subjecting a sulfuric acid solution to solvent extraction under different conditions from each other, the aforementioned problems can be solved, thereby completing the present invention. Specifically, the present invention provides the following.

(1) The present invention is a method for producing solutions, the method using a sulfuric acid solution containing nickel, cobalt, and calcium and performing the following steps in parallel: a first step for producing a mixed solution of nickel sulfate and cobalt sulfate from the sulfuric acid solution; and a second step for producing a solution of nickel sulfate from the sulfuric acid solution, in which in the first step, the sulfuric acid solution is subjected to solvent extraction by means of an extractant to obtain a first organic solvent after extraction containing calcium and a first extraction residue containing nickel and cobalt, and in the second step, the sulfuric acid solution is subjected to solvent extraction by means of an extractant to obtain a second organic solvent after extraction containing cobalt and calcium and a second extraction residue containing nickel.

(2) The present invention is the method for producing solutions of (1), in which the sulfuric acid solution is divided into two solutions at a predetermined amount ratio, and one solution is supplied to the first step and the other solution is supplied to the second step.

(3) The present invention is the method for producing solutions of (1) or (2), in which the second step includes: an extraction step for subjecting the sulfuric acid solution to solvent extraction by means of an extractant to obtain a second organic solvent after extraction containing cobalt and calcium and a second extraction residue containing nickel; and a stripping step for subjecting the second organic solvent after extraction to stripping to obtain an organic solvent after stripping containing calcium and a stripping liquid containing cobalt, and in the first step, an extraction starting liquid obtained by mixing the stripping liquid obtained in the second step with the sulfuric acid solution at a predetermined ratio is subjected to solvent extraction by means of the extractant.

(4) The present invention is the method for producing solutions of any one of (1) to (3), in which in the first step, a pH of the sulfuric acid solution is adjusted to a range of 2.5 or more and 3.5 or less and a solution after pH adjustment is subjected to solvent extraction, and in the second step, a pH of the sulfuric acid solution is adjusted to a range of more than 3.5 and 5.0 or less and a solution after pH adjustment is subjected to solvent extraction.

(5) The present invention is the method for producing solutions of any one of (1) to (4), in which in the first step, a temperature of the sulfuric acid solution is adjusted to a range of 20° C. or higher and 40° C. or lower and then subjected to solvent extraction.

(6) The present invention is the method for producing solutions of any one of (1) to (5), in which in the second step, a temperature of the sulfuric acid solution is adjusted to a range of 30° C. or higher and 60° C. or lower and then subjected to solvent extraction.

(7) The present invention is the method for producing solutions of (3), in which in the stripping step in the second step, a sulfuric acid solution of which pH is adjusted to a range of 2.0 or more and 3.0 or less and temperature is adjusted to a range of 20° C. or higher and 30° C. or lower is brought into contact with the second organic solvent after extraction to obtain a stripping liquid in which cobalt is subjected to stripping.

(8) The present invention is the method for producing solutions of any one of (1) to (7), in which the extractant used in the solvent extraction in the first step and the second step is an organic solvent containing alkylphosphonate ester.

Effects of the Invention

According to the present invention, it is possible to efficiently obtain two solutions, namely a high-purity nickel sulfate solution and a mixed solution of nickel sulfate and cobalt sulfate from a sulfuric acid solution containing nickel, cobalt, and calcium.

BRIEF DESCRIPTION OF THE DRAWINGS

FIG. 1 is a flow diagram for describing a flow of a method for producing solutions.

PREFERRED MODE FOR CARRYING OUT THE INVENTION

Hereinafter, specific embodiments of the present invention (hereinafter, referred to as "present embodiments") will be described in detail; however, the present invention is not limited to the following embodiments and can be implemented with appropriate modifications made without departing from the spirit of the present invention.

A method for producing solutions according to the present embodiment is a method for producing a nickel sulfate solution and a mixed solution of nickel sulfate and cobalt sulfate from a sulfuric acid solution containing nickel, cobalt, and calcium (hereinafter, simply referred to as "sulfuric acid solution"). Specifically, the method for producing solutions is characterized, as illustrated in FIG. 1, for example, by dividing a sulfuric acid solution as a raw material into two solutions at a predetermined amount ratio and performing, in parallel, a first step S1 for producing a mixed solution of nickel sulfate and cobalt sulfate from one sulfuric acid solution and a second step S2 for producing a nickel sulfate solution from the other sulfuric acid solution. Hereinafter, the respective steps will be described.

<<First Step (Calcium Extraction)>>

In the first step S1, a sulfuric acid solution containing nickel, cobalt, and calcium is subjected to solvent extraction using an extractant to obtain a first organic solvent after extraction containing calcium and a first extraction residue containing nickel and cobalt. That is, the first step S1 is to extract calcium from the sulfuric acid solution as a raw material, thereby obtaining a mixed solution of nickel sulfate and cobalt sulfate.

[Solvent Extraction Treatment]

In the first step S1, a solvent extraction treatment using an extractant is performed using the sulfuric acid solution serving as a raw material as an extraction starting liquid. By the solvent extraction treatment, calcium in the organic solvent containing the extractant is selectively extracted and separated into nickel and cobalt.

The extractant for extracting calcium is not particularly limited as long as it can selectively extract calcium, but an organic solvent containing alkylphosphonate ester is preferable. The alkylphosphonate ester reacts with calcium ions to form a metal salt, thereby selectively extracting calcium. Specifically, as the extractant of alkylphosphonate ester, for example, trade name: PC88A (2-ethylhexyl, 2-ethylhexyl phosphonate: manufactured by DAIHACHI CHEMICAL INDUSTRY CO., LTD.) or the like is known. Incidentally, one kind of extractant can be used alone and two or more kinds thereof can also be used as a mixture.

Further, as the extractant for extracting calcium, the extractant itself can be used without being mixed, and a mixed solvent obtained by mixing the extractant and a diluent can also be used. From the viewpoint that a viscosity or a specific weight of a solvent can be appropriately adjusted depending on the type of extractant, extraction conditions, or the like, it is preferable to use a mixed solvent of the extractant and a diluent. The ratio of the extractant to the diluent in the mixed solvent can be arbitrarily determined depending on the viscosity or the specific weight of the extractant. Incidentally, in the present specification, the "extractant" includes both the extractant itself and the mixed solvent of the extractant and a diluent.

The diluent constituting the mixed solvent with the extractant is not particularly limited as long as it can constitute an organic phase separated from the sulfuric acid solution (water phase) and dissolve the aforementioned extractant. Specifically, as the diluent, for example, a naphthene-based solvent or an aromatic solvent can be used. Incidentally, as the naphthene-based solvent, trade name: TECLEAN N20 (manufactured by JXTG Nippon Oil & Energy Corporation) or the like is known; meanwhile, as the aromatic solvent, trade name: ShellSol A150 (manufactured by Shell Chemicals Japan Ltd.) or the like is known.

Further, a volume ratio (O/A ratio) of the extractant (organic phase) to the sulfuric acid solution (water phase) is not particularly limited, but since the extraction rate of calcium increases as the O/A ratio increases, the lower limit is preferably 1.0 or more and more preferably 1.5 or more. On the other hand, when the O/A ratio is increased too much, an improvement in the effect of calcium extraction is small, and instead, there is a concern that economic efficiency deteriorates due to an increase in the amount of the extractant used, or the like. From this point, the upper limit is preferably 2.4 or less and more preferably 2.0 or less.

The specific method of the first step S1 is not particularly limited, and for example, a method of stirring and mixing the sulfuric acid solution and the extractant with a mixer or the like and then leaving the mixture to stand still to perform phase separation can be used. Further, batch mixing type using a stirring tank or a continuous extraction method using an extraction apparatus such as a mixer settler can also be used. Alternatively, a column method (for example, pulse column) of bringing the sulfuric acid solution into contact with the extractant to perform extraction or stripping can also be used. In the calcium extraction step, since calcium can be favorably extracted even in the case of selecting any method, the extraction method can be appropriately selected depending on an operation.

In the first step S1, by extracting calcium that is an impurity component by such a solvent extraction treatment using the extractant, it is possible to effectively obtain a sulfuric acid solution containing nickel and cobalt in which only calcium is reduced, as a first extraction residue by the solvent extraction. Incidentally, in the obtained sulfuric acid solution, nickel and cobalt are in the form of nickel sulfate and cobalt sulfate, respectively, and thus this solution becomes a mixed solution of nickel sulfate and cobalt sulfate. Incidentally, although described later, the obtained mixed solution of nickel sulfate and cobalt sulfate can be suitably used as a production raw material for a positive electrode material of a battery.

Incidentally, the first organic solvent after extraction containing calcium extracted by the extractant is brought into contact with an acid such as sulfuric acid or hydrochloric acid under a pH condition different from that at the time of the extraction treatment of calcium, so that a stripping treatment can be performed. According to this, calcium extracted in the organic solvent can be recovered as a solution containing a sulfuric acid salt or a chloride and be discarded through an effluent treatment separately. Further, the organic solvent after stripping can be repeatedly used for the extraction treatment with respect to the sulfuric acid solution containing calcium.

[Adjustment of pH and Temperature of Extraction Starting Liquid]

In the first step S1, from the viewpoint of performing the extraction treatment at a desired high extraction rate, it is preferable to adjust the pH and the temperature of the sulfuric acid solution as an extraction starting liquid to a predetermined range, respectively.

(Adjustment of pH)

In the first step S1, when the sulfuric acid solution as an extraction starting liquid is subjected to solvent extraction, the pH of the extraction starting liquid is adjusted to a range of 2.5 or more and 3.5 or less and preferably a range of 2.7 or more and 3.2 or less.

Herein, the sulfuric acid solution to be subjected to the extraction treatment contains, as described above, nickel, cobalt, and calcium, and as the pH of the solution increases, the amount of calcium extracted by solvent extraction increases. However, when the pH of the solution is too high, nickel and cobalt contained in the sulfuric acid solution are also extracted, so that selectivity of calcium is degraded. From this point, in the first step S1, the pH of the sulfuric acid solution as an extraction starting liquid is adjusted to a predetermined range, that is, a range of 2.5 or more and 3.5 or less, preferably a range of 2.7 or more and 3.2 or less, and then the solution after pH adjustment is subjected to solvent extraction. By adjusting the pH of the sulfuric acid solution to the aforementioned range, only calcium can be efficiently extracted and removed in the first step S1; meanwhile, extraction of nickel and cobalt can be suppressed and the recovery loss of these valuable metals can be reduced.

The adjustment of the pH with respect to the sulfuric acid solution can be performed using a pH adjuster. The pH adjuster is not particularly limited, but various kinds of acid and alkali can be used.

Specifically, as an acidic pH adjuster, for example, inorganic acids such as sulfuric acid, nitric acid, and phosphoric acid, organic acids, and the like can be used. From the viewpoint that incorporation of impurities in the solution can be suppressed since an addition target of the pH adjuster is sulfuric acid solution, sulfuric acid is preferably used. Further, as an alkaline pH adjuster, for example, inorganic alkali compounds derived from alkali metals such as lithium hydroxide, sodium hydroxide, potassium hydroxide, lithium carbonate, sodium carbonate, potassium carbonate, lithium hydrogen carbonate, sodium hydrogen carbonate, and potassium hydrogen carbonate, or organic alkali compounds such as ammonia and various amines can be used.

(Adjustment of Temperature)

In the first step S1, when the sulfuric acid solution as an extraction starting liquid is subjected to solvent extraction, the temperature of the extraction starting liquid is adjusted to preferably a range of 20° C. or higher and 40° C. or lower.

Herein, as the sulfuric acid solution containing nickel, cobalt, and calcium serving as a raw material, as described above, it is possible to use nickel sulfate or the like produced as a by-product by a process of smelting electrolytic nickel from a nickel oxide ore. For example, in the process of smelting electrolytic nickel from a nickel oxide ore, the process is performed under a high temperature and high pressure condition using an autoclave or the like in many cases, and the temperature of the sulfuric acid solution discharged from the autoclave is a high temperature reaching about 100° C. Since it is difficult to perform the subsequent treatment in such a high temperature state, a treatment of cooling the solution while holding in the atmosphere is performed, but even in this case, the subsequent treatment is generally performed at a high temperature of 40° C. or higher.

On the other hand, in the first step S1, the temperature of the sulfuric acid solution as an extraction starting liquid is adjusted to preferably a range of 20° C. or higher and 40° C. or lower and more preferably a range of 25° C. or higher and 30° C. or lower. In this way, by adjusting the temperature of the sulfuric acid solution to a range of 20° C. or higher and 40° C. or lower and then subjecting the solution to extraction treatment while the liquid temperature thereof is maintained, the extraction rate of calcium from the sulfuric acid solution can be increased.

Incidentally, when the temperature of the sulfuric acid solution is lower than 20° C., the cooling cost increases so that the treatment cannot be performed efficiently. On the other hand, when the temperature is higher than 40° C., the effect of improving the extraction rate of calcium may not be sufficiently obtained.

As the method for adjusting the temperature of the sulfuric acid solution, for example, the method can be performed using various heating-cooling apparatuses. The heating-cooling apparatuses are not particularly limited, but a plate-type heat exchanger, a multitubular heat exchanger, a double pipe heat exchanger, and the like can be used.

Incidentally, the respective treatments for the pH adjustment and the temperature adjustment with respect to the sulfuric acid solution as an extraction starting liquid are not necessarily discriminated depending on apparatuses or places. The temperature adjustment of the sulfuric acid solution can be performed in parallel with the pH adjustment of the sulfuric acid solution or may be performed separately and sequentially. However, from the viewpoint of easiness and accuracy of control of the temperature and the pH, it is preferable to perform the temperature adjustment before the pH adjustment.

[Composition Adjustment of Extraction Starting Liquid]

In the first step S1, the cobalt sulfate solution, which is obtained through the second step S2 described later, that is, a treatment performed in parallel with the first step S1 in which cobalt and calcium are extracted from the sulfuric acid solution, can be mixed with the sulfuric acid solution as an extraction starting liquid used in the first step S1 at a predetermined ratio and the extraction starting liquid having an increased concentration of cobalt can be subjected to the solvent extraction treatment.

Herein, the ratio of nickel and cobalt of a nickel-cobalt-manganese (NCM)-based positive electrode material, a nickel-cobalt-aluminum (NCA)-based positive electrode material called nickel-based positive electrode material, or the like that is a positive electrode material of a battery is about 1:1 to 10:1, but the ratio of nickel and cobalt contained in the nickel oxide ore is usually about 10:1 or less, so that the ratio of cobalt is extremely low. For this reason, in the case of using nickel sulfate derived from the nickel oxide ore as a positive electrode material of a battery, it is necessary to additionally add cobalt such that a desired composition of the positive electrode material is obtainable.

Herein, in the first step S1, as the sulfuric acid solution as an extraction starting liquid, a solution obtained by mixing a cobalt sulfate solution, which is selectively obtained through the second step S2 performed in parallel, at a predetermined ratio is used. By using the sulfuric acid solution mixed with the cobalt sulfate solution, the cobalt concentration of the solution increases, and the ratio of cobalt sulfate in the mixed solution of nickel sulfate and cobalt sulfate obtained through the first step S1 can be improved, which is preferable.

In this way, upon producing a mixed solution of nickel sulfate and cobalt sulfate suitable for a raw material for producing a positive electrode material of a battery, by using the cobalt sulfate solution selectively obtained from the second step S2 performed in parallel with the first step S1 and adding the cobalt sulfate solution to the extraction starting liquid of the first step S1, it is not necessary to produce cobalt sulfate by providing a new separate step. According to this, a mixed solution of nickel sulfate and cobalt sulfate more suitable as a solution used in production of a positive electrode material of a battery can be efficiently produced.

Incidentally, the cobalt sulfate solution obtained through the second step S2 may contain a trace amount of calcium, and without change, the cobalt sulfate solution cannot be used as a raw material for producing a positive electrode material of a battery. On the other hand, according to the aforementioned method, by adding the cobalt sulfate solution obtained through the second step S2 to an extraction starting liquid used in the extraction treatment in the first step S1 at a predetermined ratio and then using the mixture, calcium is effectively separated and removed by the solvent extraction in the first step S1, which is also preferable.

<<Second Step>>

In the second step S2, the sulfuric acid solution containing nickel, cobalt, and calcium is subjected to solvent extraction by means of an extractant to obtain a second organic solvent after extraction containing cobalt and calcium and a second extraction residue containing nickel. That is, the second step S2 is to extract cobalt and calcium from the sulfuric acid solution as a raw material, thereby obtaining a high-purity nickel sulfate solution.

Specifically, the second step S2 includes an extraction step S21 for subjecting a sulfuric acid solution as an extraction starting liquid to solvent extraction using an extractant to obtain a second organic solvent after extraction containing cobalt and calcium and a second extraction residue containing nickel and a stripping step S22 for subjecting the second organic solvent after extraction to stripping to obtain an organic solvent after stripping containing calcium and a stripping liquid containing cobalt. Hereinafter, the respective steps in the second step S2 will be described.

(1) Extraction Step (Cobalt and Calcium Extraction)

The extraction step S21 is to perform solvent extraction using an extractant while the sulfuric acid solution as a raw material is used as an extraction starting liquid. By the solvent extraction treatment, cobalt and calcium in the organic solvent containing the extractant are extracted and are separated from nickel.

The extractant for extracting cobalt and calcium is not particularly limited, but similarly to the extractant used in the solvent extraction treatment of the first step S1, an organic solvent containing alkylphosphonate ester can be used. Further, as the extractant, one kind thereof may be used alone, or two or more kinds thereof may be used as a mixture. Further, depending on extraction conditions or the like, a mixed solvent obtained by mixing the extractant and a diluent formed from a naphthene-based solvent, an aromatic solvent, or the like can be used.

Incidentally, as a specific extraction method, similarly to the method in the first step S1, the extraction can be performed by a method of stirring and mixing components with a mixer and leaving the mixture to stand still to perform phase separation, a batch mixing type using a stirring tank, a continuous extraction method using an extraction apparatus such as a mixer settler, a column method, or the like.

In the extraction step S21, by such solvent extraction, it is possible to obtain a second organic solvent after extraction containing cobalt and calcium and a nickel sulfate solution as a second extraction residue containing nickel. That is, cobalt and calcium can be separated from the sulfuric acid solution containing nickel, cobalt, and calcium and a solution containing nickel sulfate with high purity can be obtained. Incidentally, the obtained high-purity nickel sulfate solution can be used suitably as a raw material for producing a plating material or a catalyst.

(pH Adjustment)

In the extraction step S21 in the second step S2, when the sulfuric acid solution as an extraction starting liquid is subjected to solvent extraction, the pH of the extraction starting liquid is adjusted to a range of more than 3.5 and 5.0 or less and preferably a range of 4.0 or more and 4.3 or less.

Herein, the sulfuric acid solution provided to the extraction treatment is formed from the same raw material as that of the first step S1, but by performing the extraction treatment under a pH condition different from that of the first step S1, specifically, in a range of more than 3.5 and 5.0 or less, not only calcium but also cobalt that is not an extraction target in the first step S1 can be efficiently extracted, and only nickel can be transitioned to an extraction residue. According to this, it is possible to obtain a nickel sulfate solution in which calcium and cobalt are reduced and which contains nickel with high purity.

Incidentally, when the pH is 3.5 or less, similarly to the pH condition at the time of solvent extraction in the first step S1, selectivity of calcium in extraction increases so that the extraction rate of cobalt deteriorates. On the other hand, when the pH is more than 5.0, even nickel is extracted, so that it is difficult to efficiently extract and separate calcium, cobalt, and nickel.

The adjustment method of pH with respect to the sulfuric acid solution can be performed in the similar manner to the adjustment method of pH with respect to the extraction starting liquid in the first step described above.

(Adjustment of Temperature)

In the extraction step S22 in the second step S2, when the sulfuric acid solution as an extraction starting liquid is subjected to solvent extraction, the temperature of the extraction starting liquid is adjusted to preferably a range of 30° C. or higher and 60° C. or lower and more preferably a range of 35° C. or higher and 45° C. or lower.

By adjusting the temperature of the sulfuric acid solution as an extraction starting liquid to 30° C. or higher and 60° C. or lower, the extraction rates of cobalt and calcium from the sulfuric acid solution in the extraction step S21 can be increased.

Incidentally, when the temperature of the sulfuric acid solution is lower than 30° C., the viscosity of the extractant increases, so that the extraction efficiency may be degraded. On the other hand, when the adjustment temperature is higher than 60° C., the extractant may volatilize, and as a result, a decrease in extraction rate is caused, which is not preferable.

The adjustment method of the temperature of the sulfuric acid solution can be performed in the similar manner to the adjustment method of the temperature with respect to the extraction starting liquid in the first step described above.

(2) Stripping Step

The stripping step S22 is to subject the aforementioned second organic solvent after extraction to stripping, thereby obtaining an organic solvent after stripping containing calcium and a stripping liquid containing cobalt. Specifically, the stripping step S22 is to bring the second organic solvent after extraction into contact with a sulfuric acid solution and selectively backward extract cobalt from the organic solvent, thereby obtaining a cobalt sulfate solution as a stripping liquid. That is, in the second step S2 for mainly producing a solution of nickel sulfate, a cobalt sulfate solution having a high cobalt concentration can be obtained from the second organic solvent after extraction which becomes unnecessary.

The cobalt sulfate solution obtained in the stripping step S22 is, as described above, mixed with the sulfuric acid solution as an extraction starting liquid used in the first step S1 at a predetermined ratio, and the mixture can be used as an adjuster for adjusting a content ratio of cobalt contained in the extraction starting liquid. According to this, the cobalt concentration of the extraction starting liquid used in the first step S1 can be appropriately adjusted to a desired degree, and the cobalt concentration of the mixed solution of nickel sulfate and cobalt sulfate obtained in the first step S1 can be increased.

The stripping treatment in the stripping step S22 is not particularly limited, but is preferably performed under a temperature condition in a range of 20° C. or higher and 30° C. or lower. By adjusting the temperature of the solution at the time of the stripping treatment to a range of 20° C. or higher and 30° C. or lower, selectivity of only cobalt to be subjected to stripping can be increased, and a cobalt sulfate solution as a stripping liquid in which calcium as an impurity component is reduced can be obtained.

Incidentally, when the temperature at the time of the stripping treatment is higher than 30° C., the amount of calcium to be subjected to stripping along with cobalt increases, so that the calcium concentration of the obtained cobalt sulfate solution may increase. Further, as the calcium concentration of the cobalt sulfate solution increases, when this calcium exceeds the degree of solubility of gypsum ($CaSO_4.2H_2O$), the calcium may cause clogging in pipes or the like in a facility. On the other hand, when the temperature at the time of the stripping treatment is lower than 20° C., the cooling cost increases, so that the treatment cannot be performed efficiently.

The stripping treatment in the stripping step S22 is performed, as described above, by bringing the second organic solvent after extraction as a stripping target into contact with a sulfuric acid solution. At this time, as the sulfuric acid solution, it is preferable to use a sulfuric acid solution having a pH of a range of 2.0 or more and 3.0 or less. By using the sulfuric acid solution having a pH of a range of 2.0 or more and 3.0 or less, only cobalt can be efficiently subjected to stripping, so that a high-purity cobalt sulfate solution can be obtained.

Further, as the sulfuric acid solution, it is preferable to use a sulfuric acid solution of which liquid temperature is adjusted to 20° C. or higher and 30° C. or higher. As described above, the stripping treatment is preferably performed under the condition that the liquid temperature is set to 20° C. or higher and 30° C. or lower, but by adjusting the temperature of the sulfuric acid solution used in stripping to the similar range, the temperature control can be performed more efficiently.

The volume ratio (O/A ratio) of the extractant (organic phase) to the sulfuric acid solution (water phase) is not particularly limited, but from the viewpoint that the cobalt concentration of the cobalt sulfate solution to be generated increases as the O/A ratio increases, the lower limit is preferably 5.0 or more and more preferably 7 or more. On the other hand, when the O/A ratio is increased too much, the yield of cobalt is decreased, so that the upper limit is preferably 12 or less and more preferably 10 or less.

<<Use Application of Mixed Solution of Nickel Sulfate and Cobalt Sulfate>>

In the method for producing solutions according to the present embodiment, in the first step S1, calcium is efficiently separated and removed from the sulfuric acid solution containing nickel, cobalt, and calcium, so that a mixed solution of nickel sulfate and cobalt sulfate can be obtained.

The use application of the mixed solution of nickel sulfate and cobalt sulfate obtained in this way is not particularly limited, but for example, the mixed solution can be used as a raw material for producing an NCM-based positive electrode material or NCA-based positive electrode material containing nickel and cobalt that is a positive electrode material of a lithium ion battery or the like. Further, other than, the mixed solution can be used as a raw material for producing various alloys, composite oxides, or the like containing nickel and cobalt.

The positive electrode material such as an NCM-based positive electrode material or an NCA-based positive electrode material is a positive electrode material formed from a composite oxide containing nickel and cobalt. The positive electrode material can be produced using, as a production raw material, a solution obtained after only impurity element is effectively separated and removed from the solution containing at least nickel and cobalt. In this point, according to the method for producing solutions of the present embodiment, since only calcium can be selectively extracted and separated from the sulfuric acid solution containing nickel, cobalt, and calcium, the sulfuric acid solution after calcium is extracted and separated becomes a mixed solution of nickel sulfate and cobalt sulfate in which impurities are reduced. Therefore, by using the mixed solution as a raw material, a positive electrode material containing nickel and cobalt can be produced at low cost.

Further, the obtained mixed solution of nickel sulfate and cobalt sulfate can also be used as a raw material for producing an alloy, a complex metal oxide, or the like. Incidentally, at this time, when the number of elements contained in the obtained sulfuric acid solution is smaller than a target composition of an alloy, a composite oxide, or the like, a raw material can be supplied from other raw materials. In this case, when the amount of metal, ion, or the like contained in the sulfuric acid solution containing nickel and cobalt or a mixture of nickel and cobalt recovered from the sulfuric acid solution is analyzed in advance, the number of elements to be supplied is properly identified so that a desired alloy or composite metal oxide can be produced.

<<Use Application of Nickel Sulfate>>

Further, in the method for producing solutions according to the present embodiment, in the second step S2 performed in parallel with the first step S1, cobalt and calcium are efficiently separated and removed from the sulfuric acid solution containing nickel, cobalt, and calcium, so that a nickel sulfate solution can be obtained.

Since the nickel sulfate solution obtained in this way is a high-purity nickel sulfate solution in which cobalt and calcium are effectively reduced, as use application thereof, the nickel sulfate solution can be used as various industrial raw materials including plating raw materials, and can be effectively used as a raw material for producing an electronic material, a catalyst material, or the like.

EXAMPLES

Hereinafter, the present invention will be described in more detail by means of Examples of the present invention, but the present invention is not limited to these Examples.

Example 1

The following first step and second step were performed in parallel using a sulfuric acid solution containing nickel, cobalt, and calcium as a raw material. As the sulfuric acid solution serving as a raw material, a sulfuric acid solution having a nickel concentration of 130 g/L, a cobalt concentration of 10 g/L, and a calcium concentration of 0.50 g/L was used, this solution was divided into two solution at a predetermined amount ratio, one solution was supplied to the first step and the other solution was supplied to the second step and they were each processed.

[First Step (Calcium Extraction)]

Alkylphosphonate ester (2-ethylhexyl, 2-ethylhexyl phosphonate (trade name: PC88A: manufactured by DAIHACHI CHEMICAL INDUSTRY CO., LTD.)) as a extractant (mixed solvent) and a diluent (naphthene-based solvent (trade name: TECLEAN N20 (manufactured by JXTG Nippon Oil & Energy Corporation)) were prepared, and the extractant and the diluent was mixed such that the alkylphosphonate ester would be 20% by volume and the diluent would be 80% by volume, thereby preparing a mixed solvent for solvent extraction.

Then, the sulfuric acid solution as a raw material was used as an extraction starting liquid and brought into contact with the mixed solvent containing the extractant, as presented in the following Table 1, the temperature was adjusted to a range of 22° C. to 40° C., the pH was adjusted to a range of 2.7 to 3.5, and then a multistage countercurrent reaction was performed in a 3 L mixer settler. The volume ratio (O/A) of the extractant (organic phase) to the sulfuric acid solution (water phase) was adjusted such that the value after the reaction would be a range of 1.0 to 2.4. Further, the temperature was maintained constant by indirectly cooling or heating the mixer settler using water as a medium. Incidentally, the pH was continuously monitored using a pH meter manufactured by DKK-TOA CORPORATION.

After termination of the reaction, the organic solvent after extraction (organic phase) and an extraction residue (water phase) which were phase-separated were recovered respectively. Then, the metal concentration of each of the organic solvent after extraction and the extraction residue was analyzed using an ICP emission spectrometer. A value obtained by dividing the mass of each metal component in the organic solvent after extraction obtained from the analysis value by the mass of each metal component in the sulfuric acid solution was regarded as an extraction rate, and the extraction rate of each metal was calculated. The analysis results are collectively presented in Table 1.

TABLE 1

| Condition | | | Extraction rate [%] | | |
|---|---|---|---|---|---|
| Temperature [° C.] | pH | O/A | Ni | Co | Ca |
| 22 | 3.0 | 1.0 | 0.2 | 6 | 95 |
| 24 | 2.7 | 2.4 | 0.2 | 9 | 98 |
| 30 | 3.2 | 1.0 | 0.3 | 14 | 95 |
| 30 | 2.9 | 2.4 | 0.3 | 14 | 97 |
| 40 | 3.5 | 1.0 | 0.4 | 45 | 91 |
| 40 | 3.0 | 2.4 | 0.4 | 31 | 96 |

From the results of Table 1, it was found that in the solvent extraction treatment in the first step, under the conditions including a temperature of 22° C. to 40° C., a pH of 2.7 to 3.5, and O/A of 1 to 2.4, in all cases, the extraction rate of calcium is higher than the extraction rates of nickel and cobalt and calcium can be efficiently extracted. Further, it was possible to effectively produce a mixed solution of nickel sulfate and cobalt sulfate as an extraction residue by the solvent extraction treatment in the first step.

[Second Step]

(1) Extraction Step (Cobalt and Calcium Extraction)

The same mixed solvent containing the alkylphosphonate ester as the extractant used in the first step S1 was used as an extractant, the conditions of the temperature and the pH were changed as presented in the following Table 2 such that the temperature was changed to 40° C. and the pH was changed to 4.0 to 4.3, and the same operation was performed.

After termination of the reaction, the organic solvent after extraction (organic phase) and an extraction residue (water phase) which were phase-separated were recovered respectively. Then, the metal concentration of each of the organic solvent after extraction and the extraction residue was analyzed using an ICP emission spectrometer. A value obtained by dividing the mass of each metal component in the organic solvent after extraction obtained from the analysis value by the mass of each metal component in the sulfuric acid solution was regarded as an extraction rate, and the extraction rate of each metal was calculated. The analysis results are collectively presented in Table 2.

TABLE 2

| Condition | | | Extraction rate [%] | | |
|---|---|---|---|---|---|
| Temperature [° C.] | pH | O/A | Ni | Co | Ca |
| 40 | 4.0 | 2.4 | 4.6 | 100 | 100 |
| 40 | 4.2 | 2.4 | 5.4 | 100 | 100 |
| 40 | 4.3 | 2.4 | 6.6 | 100 | 100 |

From the results of Table 2, it was found that in the solvent extraction treatment in the second step, under the conditions including a temperature of 40° C., a pH of 4.0 to 4.3, and O/A of 2.4, in all cases, the extraction rates of cobalt and calcium were 100%; on the other hand, the extraction rate of nickel was sufficiently low of 4 to 7%, and thus cobalt and calcium can be efficiently extracted. Further, it was possible to effectively produce a nickel sulfate solution as an extraction residue by the solvent extraction treatment in the second step.

(2) Stripping Step (Cobalt Stripping)

Subsequently, the organic solvent after extraction and the sulfuric acid solution which were obtained by the solvent extraction treatment were brought into contact with each other to perform a treatment of subjecting cobalt to stripping. As the conditions for the stripping treatment, the stripping was performed while the temperature was adjusted to 20° C. to 30° C. and the pH of the sulfuric acid solution was adjusted to 2.6 to 2.7, as presented in the following Table 3. Incidentally, the pH of the sulfuric acid solution was performed by adjusting a ratio of sulfuric acid and pure water.

After termination of the reaction, the organic solvent after stripping (organic phase) and a stripping residue (water phase) which were phase-separated were recovered respectively. Then, the metal concentration of each of the organic solvent after stripping and the stripping residue (cobalt sulfate solution) was analyzed using an ICP emission spectrometer. A value obtained by dividing the mass of each metal component in the organic solvent after stripping obtained from the analysis value by the mass of each metal component in the organic solvent after extraction obtained by the preceding solvent extraction was regarded as an extraction rate, and the extraction rate was calculated. The analysis results of the extraction rates and the metal concentration of the stripping residue (cobalt sulfate solution) are collectively presented in Table 3.

TABLE 3

| Condition | | | Extraction rate [%] | | | Metal concentration [g/L] | | |
|---|---|---|---|---|---|---|---|---|
| Temperature [° C.] | pH | O/A | Ni | Co | Ca | Ni | Co | Ca |
| 20 | 2.6 | 7.0 | 0.03 | 0.2 | 72 | 24 | 30 | 0.45 |
| 30 | 2.7 | 7.0 | 0.04 | 0.6 | 70 | 20 | 32 | 0.48 |

From the results of Table 3, it was found that in the stripping treatment in the second step, under the conditions including a temperature of 20° C. to 30° C., a pH of 2.6 to 2.7, and O/A of 7.0, in all cases, the extraction rates of nickel and cobalt were sufficiently low, the extraction rate of calcium was about 70%, and thus the stripping of calcium was suppressed to be low while the cobalt was sufficiently subjected to stripping, in those condition ranges. Further, it was possible to effectively produce a cobalt sulfate solution as a stripping liquid by the stripping treatment in the second step.

[Composition Adjustment of Extraction Starting Liquid]

Subsequently, the cobalt sulfate solution obtained by the stripping treatment in the second step described above was mixed with a sulfuric acid solution (starting liquid) having a nickel concentration of 130 g/L, a cobalt concentration of 10 g/L, and a calcium concentration of 0.5 g/L. Then, the sulfuric acid solution of which composition was adjusted by mixing the cobalt sulfate solution was used as an extraction starting liquid and was subjected to the solvent extraction in the first step described above. Incidentally, as the conditions for the solvent extraction treatment, the solvent extraction treatment was performed while the temperature was adjusted to 30° C. and the pH was adjusted to 2.8.

After termination of the reaction, the organic solvent after extraction (organic phase) and an extraction residue (water phase) which were phase-separated were recovered respectively. Then, the metal concentration of each of the organic solvent after extraction and the extraction residue was analyzed using an ICP emission spectrometer. A value obtained by dividing the mass of each metal component in the organic solvent after extraction obtained from the analysis value by the mass of each metal component in the sulfuric acid solution was regarded as an extraction rate, and the extraction rate was calculated. The analysis results of the extraction rates and the metal concentration of the extraction residue are collectively presented in Table 4. Incidentally, in Table 4, the concentration of each metal component in the extraction starting liquid used in the solvent extraction treatment and the sulfuric acid solution as a starting liquid are also presented along with the analysis results.

TABLE 4

| Condition | | | Extraction rate [%] | | | Metal concentration [g/L] | | |
|---|---|---|---|---|---|---|---|---|
| Temperature [° C.] | pH | O/A | Ni | Co | Ca | Ni | Co | Ca |
| 30 | 2.8 | 2.4 | 0.3 | 10 | 95 | 110 | 13 | 0.03 |
| Extraction starting liquid (Mixing cobalt sulfate with starting liquid) | | | | | | 110 | 14 | 0.47 |
| Sulfuric acid solution (Starting liquid) | | | | | | 130 | 10 | 0.50 |

From the results of Table 4, under the conditions including a temperature of 30° C., a pH of 2.8, and O/A of 2.4, it was possible to extract calcium at a high rate, namely an extraction rate of 95% or more. Further, from the results, it was found that, by using, as an extraction starting liquid, the sulfuric acid solution of which composition was adjusted by mixing the cobalt sulfate solution obtained in the stripping step S22, a mixed solution of nickel sulfate and cobalt sulfate having an increased cobalt concentration can be obtained.

The invention claimed is:

1. A method for producing solutions, the method using a sulfuric acid solution containing nickel, cobalt, and calcium and performing the following steps in parallel:
   a first step for producing a mixed solution of nickel sulfate and cobalt sulfate from the sulfuric acid solution; and
   a second step for producing a solution of nickel sulfate from the sulfuric acid solution, wherein
   in the first step, the sulfuric acid solution is subjected to solvent extraction by means of an extractant to obtain a first organic solvent after extraction containing calcium and a first extraction residue containing nickel and cobalt, and
   in the second step, the sulfuric acid solution is subjected to solvent extraction by means of an extractant to obtain a second organic solvent after extraction containing cobalt and calcium and a second extraction residue containing nickel.

2. The method for producing solutions according to claim 1, wherein the sulfuric acid solution is divided into two solutions at a predetermined amount ratio, and
   one solution is supplied to the first step and the other solution is supplied to the second step.

3. The method for producing solutions according to claim 1, wherein the second step includes:
   an extraction step for subjecting the sulfuric acid solution to solvent extraction by means of an extractant to obtain a second organic solvent after extraction containing cobalt and calcium and a second extraction residue containing nickel; and
   a stripping step for subjecting the second organic solvent after extraction to stripping to obtain an organic solvent after stripping containing calcium and a stripping liquid containing cobalt, and
   in the first step, an extraction starting liquid obtained by mixing the stripping liquid obtained in the second step with the sulfuric acid solution at a predetermined ratio is subjected to solvent extraction by means of the extractant.

4. The method for producing solutions according to claim 1, wherein in the first step, a pH of the sulfuric acid solution is adjusted to a range of 2.5 or more and 3.5 or less and a solution after pH adjustment is subjected to solvent extraction, and
   in the second step, a pH of the sulfuric acid solution is adjusted to a range of more than 3.5 and 5.0 or less and a solution after pH adjustment is subjected to solvent extraction.

5. The method for producing solutions according to claim 1, wherein in the first step, a temperature of the sulfuric acid solution is adjusted to a range of 20° C. or higher and 40° C. or lower and then subjected to solvent extraction.

6. The method for producing solutions according to claim 1, wherein in the second step, a temperature of the sulfuric acid solution is adjusted to a range of 30° C. or higher and 60° C. or lower and then subjected to solvent extraction.

7. The method for producing solutions according to claim 3, wherein in the stripping step in the second step,
   a sulfuric acid solution of which pH is adjusted to a range of 2.0 or more and 3.0 or less and temperature is adjusted to a range of 20° C. or higher and 30° C. or lower is brought into contact with the second organic solvent after extraction to obtain a stripping liquid in which cobalt is subjected to stripping.

8. The method for producing solutions according to claim 1, wherein the extractant used in the solvent extraction in the first step and the second step is an organic solvent containing alkylphosphonate ester.

9. The method for producing solutions according to claim 2, wherein the second step includes:
an extraction step for subjecting the sulfuric acid solution to solvent extraction by means of an extractant to obtain a second organic solvent after extraction containing cobalt and calcium and a second extraction residue containing nickel; and
a stripping step for subjecting the second organic solvent after extraction to stripping to obtain an organic solvent after stripping containing calcium and a stripping liquid containing cobalt, and
in the first step, an extraction starting liquid obtained by mixing the stripping liquid obtained in the second step with the sulfuric acid solution at a predetermined ratio is subjected to solvent extraction by means of the extractant.

10. The method for producing solutions according to claim 2, wherein in the first step, a pH of the sulfuric acid solution is adjusted to a range of 2.5 or more and 3.5 or less and a solution after pH adjustment is subjected to solvent extraction, and
in the second step, a pH of the sulfuric acid solution is adjusted to a range of more than 3.5 and 5.0 or less and a solution after pH adjustment is subjected to solvent extraction.

11. The method for producing solutions according to claim 3, wherein in the first step, a pH of the sulfuric acid solution is adjusted to a range of 2.5 or more and 3.5 or less and a solution after pH adjustment is subjected to solvent extraction, and
in the second step, a pH of the sulfuric acid solution is adjusted to a range of more than 3.5 and 5.0 or less and a solution after pH adjustment is subjected to solvent extraction.

12. The method for producing solutions according to claim 2, wherein in the first step, a temperature of the sulfuric acid solution is adjusted to a range of 20° C. or higher and 40° C. or lower and then subjected to solvent extraction.

13. The method for producing solutions according to claim 3, wherein in the first step, a temperature of the sulfuric acid solution is adjusted to a range of 20° C. or higher and 40° C. or lower and then subjected to solvent extraction.

14. The method for producing solutions according to claim 4, wherein in the first step, a temperature of the sulfuric acid solution is adjusted to a range of 20° C. or higher and 40° C. or lower and then subjected to solvent extraction.

15. The method for producing solutions according to claim 2, wherein in the second step, a temperature of the sulfuric acid solution is adjusted to a range of 30° C. or higher and 60° C. or lower and then subjected to solvent extraction.

16. The method for producing solutions according to claim 3, wherein in the second step, a temperature of the sulfuric acid solution is adjusted to a range of 30° C. or higher and 60° C. or lower and then subjected to solvent extraction.

17. The method for producing solutions according to claim 4, wherein in the second step, a temperature of the sulfuric acid solution is adjusted to a range of 30° C. or higher and 60° C. or lower and then subjected to solvent extraction.

18. The method for producing solutions according to claim 5, wherein in the second step, a temperature of the sulfuric acid solution is adjusted to a range of 30° C. or higher and 60° C. or lower and then subjected to solvent extraction.

19. The method for producing solutions according to claim 2, wherein the extractant used in the solvent extraction in the first step and the second step is an organic solvent containing alkylphosphonate ester.

20. The method for producing solutions according to claim 3, wherein the extractant used in the solvent extraction in the first step and the second step is an organic solvent containing alkylphosphonate ester.

* * * * *